Patented Nov. 3, 1953

2,657,978

UNITED STATES PATENT OFFICE 2,657,978

ALUMINA HYDRATE CRYSTALLIZATION

Martin A. Johnson, Baton Rouge, La., assignor to Kaiser Aluminum & Chemical Corporation, a corporation of Delaware No Drawing. Application September 8, 1948, Serial No. 48,329

4 Claims. (Cl. 23—143)

This invention relates to the process for recovering alumina values from ores such as bauxite containing this material, and more particularly to the crystallization step in this process by which alumina hydrate crystals are precipitated from a solution.

In general, the Bayer process for obtaining alumina from bauxite consists in treating the bauxite with a caustic solution to convert the alumina to a soluble compound generally regarded to be sodium aluminate. A super-saturated concentration of the sodium aluminate is produced so that crystallization in it will occur and result in the formation and precipitation of alumina hydrate crystals. The caustic which is also generated at the time that the alumina hydrate crystals are formed is re-used in the system for further processing.

As it is generally practiced, the solution containing the sodium aluminate is seeded with small crystals of alumina hydrate for the purpose of increasing the rate of crystallization from the solution. These small crystals which are introduced, serve as nuclei for the formation of large crystals of alumina hydrate. It has been recognized that the mother liquor which remains after the crystallization step is stopped, still contains a relatively large amount of sodium aluminate from which additional alumina hydroxide should be recoverable. However, it has not been practical to obtain increased crystallization because the additional time which would be required would make this uneconomical.

It is a primary object of the present invention to obtain an increased yield of alumina hydroxide from the super-saturated solution containing sodium aluminate.

It is a further object of the invention to obtain an increased yield of alumina hydrate without requiring any material change in the process as it is generally practiced.

A still further object of the invention is to obtain an increased yield of alumina hydrate without requiring any additional period of time than is required at the present.

Other objects of the invention will become apparent from a consideration of the following description and examples of the invention.

To obtain crystallization of alumina hydrate from the super-saturated solution containing soduim aluminate, this super-saturated solution is generally charged into a tank of large size, together with a relatively small amount of a slurry containing alumina hydrate crystals. For example, the seed slurry may amount to approximately 10 per cent by volume of the sodium aluminate solution to which it is added. This slurry may, for example, contain about 25 per cent by weight of seed crystals. This mixture of the sodium aluminate solution and the seed slurry is subjected to agitation for a period of approximately 35 hours—after which it is withdrawn and sent to a classifier to separate the large alumina hydrate crystals from the mother liquor and the undersized alumina hydrate crystals.

In accordance with the present invention, this process is modified by the separate addition of the seed slurry at two different time intervals. The first quantity of seed slurry is added to the sodium aluminate solution at the time that it is delivered into the crystallization tank, and after a time interval during which partial crystallization occurs from the sodium aluminate solution, an additional amount of seed slurry is added. It has been found that this second addition of seed slurry materially increases the total amount of alumina hydrate which is precipitated from the original green liquor, even though the total time interval involved does not exceed the time which heretofore has been required, if only the single initial addition of seed slurry is made.

In carrying out the invention it has been found preferable that not more than one-half of the total amount of seed slurry which is to be added, be introduced initially into the super-saturated sodium aluminate solution. The total amount of seed slurry which is added in both the first and second additions of the seed slurry should be on the order of 20 per cent by volume of the initial quantity of sodium aluminate solution, for a seed slurry containing about 25 per cent by weight of seed crystals.

Although the invention is here disclosed in terms of the use of a seed slurry containing about 25 per cent by weight of alumina hydrate crystals, it will be evident that the invention can be practiced if this slurry contains a greater or a less amount of the alumina hydrate crypstals by weight. Thus, the important factor is the actual amount of alumina hydrate crystals which are added to the green liquor containing the sodium aluminate, and the required amount will be introduced by using a larger quantity of less dense seed slurry or by the addition of a smaller volume of seed slurry containing a greater amount by weight of seed crystals. It is to be understood, consequently, that the invention contemplates the addition on an equivalent basis of the amount of seed crystals which is introduced in accordance with the conditions which are here set forth.

It has been stated above that the quantity of seed slurry which is added as a result of the first and second additions to the green liquor, should constitute on the order of 20 per cent of the volume of green liquor to which it is added. However, the invention contemplates that this seed slurry may constitute from 15 to 25 per cent by volume of the sodium aluminate solution, based on a 25 per cent by weight concentration of seed in the slurry.

It has also been noted above that the amount of seed slurry which is initially introduced with the green liquor should not exceed more than half of the total amount of the seed slurry. In this respect, the volume of seed slurry which is initially added may constitute from one-fourth to one-half of the total amount of seed slurry which is used. This means that the volume of seed slurry which is introduced in the second addition will constitute from one-half to three-fourths of the total amount supplied as a result of the two additions.

The volume of seed slurry which is initially added, has been found to preferably constitute about forty per cent of the total amount of seed slurry which is added as a result of the two additions. This means that, on the basis of the volume of the green liquor to which the two separate quantities of seed slurry are added, the initial addition of seed slurry should preferably constitute about eight per cent of this volume and the second seed slurry should constitute about twelve per cent of this volume. Here, again, it is to be noted that this is based upon a twenty-five per cent by weight alumina hydrate crystal content of the seed slurry. A greater or less dense seed slurry would require more or less addition of the seed slurry so that an equivalent amount of the seed crystals is added.

To state the invention in more general terms, it may be pointed out that the amount of seed slurry which is initially added may amount to from about 4 to 12 per cent of the volume of the green liquor to which it is added. The amount of seed slurry which is introduced at the second addition should amount to from about 8 per cent to about 18 per cent by volume of the original quantity of the green liquor. These percentages are based upon a seed content in the slurry of about 25 per cent, as has been discussed above.

Mention has already been made of the fact that the total time required for the crystallization in accordance with the two stage addition of seed slurry, will generally require about the same amount of time that is generally practiced, if only the initial addition of seed slurry is made. The amount of time which may be allowed for crystallization to take place after the addition of the initial seed slurry, may constitute from 30 to 55 per cent of the total precipitation time which is allowed, and it has been found that the optimum period of time is about 40 per cent of the total crystallization period. For example, if a total of thirty-five hours is alloted for the crystallization to take place, it is preferable that about fifteen hours elapse before the second addition of seed slurry, but this may be from ten to twenty hours.

To further set forth the nature of the invention, the following example may be pointed out. In this example, the ratio which is expressed as A/C sets forth the relative amount of alumina with respect to caustic which is contained in a unit volume. The alumina in this ratio is the weight of the alumina found to be present, but the weight of caustic is expressed in terms of causticized sodium carbonate. In this respect, for example, 113 grams of sodium hydroxide are considered to be the equivalent of 150 grams of causticized sodium carbonate.

*Example*

| | |
|---|---:|
| Sodium aluminate solution, gallons | 170,000 |
| Pounds of $Al_2O_3$ per gallon | 0.743 |
| A/C ratio, initial | .613 |
| Seed slurry used: | |
| Percent seed by weight | 25.9 |
| Percent left on 200 mesh screen | 5.5 |
| Percent left on 325 mesh screen | 22.9 |
| Percent fines | 36.1 |
| First addition of seed slurry: | |
| Gallons added | 15,800 |
| Agitation in hours before second addition | 15 |
| A/C ratio at end of time | .370 |
| Second addition of seed slurry: | |
| Gallons added | 19,000 |
| Agitation in hours after its addition | 20 |
| Alumina hydrate recovery: | |
| Percent left on 200 mesh screen | 52.5 |
| Percent left on 325 mesh screen | 82.9 |
| Percent fines | 2.9 |

These results which are obtained from practice of the present invention are to be contrasted with the results obtained by following the usual procedure which involves the single addition of seed slurry. A test according to this usual practice has shown that if 20,300 gallons of the same seed slurry is added to the same amount of green liquor, 170,000 gallons, and if agitation is carried out for a total of thirty-five hours, the A/C ratio of the spent liquor is 0.305.

This is to be contrasted with the A/C ratio obtained in the same thirty-five hour period by practicing the invention, which was found to be 0.285. This reduction in the A/C ratio by following the procedure of the invention obviously means that a greater amount of alumina hydrate precipitation was obtained.

An analysis of the alumina hydrate crystals which were obtained as a result of the tests in following the usual procedure, give the following results:

| | |
|---|---:|
| Percent left on 200 mesh screen | 21.1 |
| Percent left on 325 mesh screen | 62.1 |
| Percent fines | 12.8 |

A comparison of this analysis with the analysis of the hydrate obtained by the two stage addition of seed slurry shows that the crystals which are obtained as a result of the present invention are considerably larger in size.

By employing this method, therefore, several advantages are obtained. One benefit is that the alumina hydrate that is precipitated and sent on to be calcined has a larger average size of particles and also a small proportion of undesirable fines. Those qualities are beneficial because they are imparted to the calcined alumina and improve it for reduction purposes. Another advantage is that the spent liquor has a lower finishing ratio of grams of alumina with respect to grams of causticized sodium carbonate per liter. It means that the aluminate solution is stripped of more of its alumina than had been taken out in precipitation by earlier methods. Furthermore, the control over conditions and results in the precipitation department is made easier. The relative proportion of coarse hydrate for calcination is more easily adjusted to meet requirements. The quantity of seed on hand is always adequate to meet current needs, but is never too large to be contained in the regular storage tank.

To apply this system to the process of continuous precipitation, the initial seeding can be added continuously to the flow of sodium aluminate solution. When the process of precipitation has reached a limited range and the product classified, we now enter step two. At this stage, the lower ratio sodium aluminate solution in the process of continuous precipitation is at the desired point for the second interval of continuous seeding and the process of precipitation continues until the ratio of $Al_2O_3$/caustic has dropped as low as possible.

The product from the first step will be largely of calcine grade material with a relatively small amount of fines. All the hydrate precipitated from the second step may be used as seed, and this material will not need to be classified since all material from second step precipitation may be used as seed. Enough seed may be added to reduce the ratio of $Al_2O_3$/caustic as low as possible without regard to particle size of the product.

I claim:

1. In a process of crystallizing alumina hydrate from a body of caustic liquor supersaturated with respect to sodium aluminate, the improvement which comprises, adding a first quantity of alumina hydrate seed crystals to the liquor in an amount equal to from about 25 to not more than about 50% of the total quantity of seed employed on the said body of liquor, agitating the liquor containing the first quantity of seed for a period of time after addition of all of said first quantity of seed from about 30 to about 55% of the total crystallization period and before the addition of the balance of the total quantity of seed, whereby the alumina hydrate thus obtained is characterized by predominantly coarse crystals of calcination grade with a minimum of fines, and thereafter making a second addition to the body of the liquor of the balance of the alumina hydrate seed to increase the rate of precipitation of alumina hydrate in the form of a fraction substantially all of which comprises fine crystals of seed grade.

2. In the process of crystallizing alumina hydrate from a body of caustic liquor supersaturated with respect to sodium aluminate, wherein the liquor is seeded with a predetermined amount of alumina hydrate to produce the lowest obtainable alumina to caustic ratio of the liquor at the end of an allotted precipitation time, the improvement of increasing the particle size of alumina hydrate crystals while still obtaining a minimum alumina to caustic ratio in the treated liquor, which comprises, adding a first quantity of alumina hydrate seed crystals to the body of liquor in an amount not exceeding about 50% of the total quantity of seed employed on the body of liquor, agitating the liquor containing the first quantity of seed for a period of time after addition of all of said first quantity of seed from about 30 to about 55% of the total allotted precipitation time and before addition of the balance of the seed to produce a first fraction of alumina hydrate crystals characterized as predominantly coarse alumina hydrate crystals of calcination grade and a relatively minor amount of fines, and thereafter making a second addition to the body of the liquor of the balance of the total quantity of alumina hydrate to obtain a minimum alumina to caustic ratio in the liquor by production of an alumina hydrate crystal fraction substantially all of which comprises fine crystals of seed grade.

3. In the process of crystallizing alumina hydrate from a body of caustic liquor supersaturated with respect to sodium aluminate, the improvement of increasing the average particle size of the alumina hydrate crystals precipitated from the liquor while obtaining a minimum alumina to caustic ratio in the liquor at the end of an allotted crystallization time, which comprises, adding a first quantity of alumina hydrate seed crystals to the body of green liquor in an amount equivalent to that contained in a volume of 25% by weight alumina hydrate seed slurry of from about 4 to about 12% of the volume of the body of liquor, agitating the liquor containing the first quantity of seed for a period of time after addition of all of said first quantity of seed from about 30 to about 55% of the total crystallization period and before the addition of the balance of the total quantity of seed to produce the first alumina hydrate crystal fraction of predominantly coarse crystals of calcination grade with a minimum of fines, and thereafter making a second addition of the balance of the total quantity of seed to the body of liquor in an amount equivalent to that contained in a volume of 25% by weight alumina hydrate seed slurry of from about 8 to about 18% of the green liquor volume, the first addition of seed slurry being from one fourth to one half of the total amount of seed slurry added, and after the second addition of seed slurry agitating the liquor for the balance of the total allotted crystallization time to produce a second fraction of predominantly fine alumina hydrate crystals of seed grade thereby also obtaining the minimum alumina to caustic ratio in the liquor within the total crystallization time, and separating the first produced predominantly coarse crystal fraction from the second produced predominantly fine crystal fraction.

4. A process according to claim 3 in which the first produced predominantly coarse hydrate crystal fraction is separated from the liquor prior to the second addition thereto of the balance of the total quantity of seed.

MARTIN A. JOHNSON.

References Cited in the file of this patent

UNITED STATES PATENTS

| Number | Name | Date |
|---|---|---|
| 1,070,438 | Fickes | Aug. 19, 1913 |
| 1,943,786 | Cowles | Jan. 16, 1934 |